United States Patent
Tsafaridis et al.

(10) Patent No.: US 10,160,598 B2
(45) Date of Patent: Dec. 25, 2018

(54) METHOD FOR ARRANGING COILS IN A WAREHOUSE

(71) Applicant: Carego Innovative Solutions Inc., Burlington (CA)

(72) Inventors: Demetrius Tsafaridis, Hamilton (CA); Martin Boni, Hamiton (CA)

(73) Assignee: Carego Innovative Solutions, Inc., Ontario (CA)

( * ) Notice: Subject to any disclaimer, the term of this patent is extended or adjusted under 35 U.S.C. 154(b) by 0 days.

(21) Appl. No.: 14/395,203

(22) PCT Filed: Apr. 5, 2013

(86) PCT No.: PCT/CA2013/000329
§ 371 (c)(1),
(2) Date: Oct. 17, 2014

(87) PCT Pub. No.: WO2014/066976
PCT Pub. Date: May 8, 2014

(65) Prior Publication Data
US 2015/0232274 A1    Aug. 20, 2015

Related U.S. Application Data

(60) Provisional application No. 61/721,865, filed on Nov. 2, 2012.

(30) Foreign Application Priority Data

Nov. 14, 2012    (CA) ..................................... 2795624

(51) Int. Cl.
*B65G 1/16*    (2006.01)
*B65G 57/20*    (2006.01)
(Continued)

(52) U.S. Cl.
CPC ............... *B65G 1/16* (2013.01); *B65G 57/20* (2013.01); *B65G 59/02* (2013.01); *B66C 13/18* (2013.01); *B66C 17/06* (2013.01); *Y10T 428/18* (2015.01)

(58) Field of Classification Search
CPC ........... B65G 1/16; B65G 57/20; B65G 57/22
See application file for complete search history.

(56) References Cited

U.S. PATENT DOCUMENTS

| | | |
|---|---|---|
| 4,503,978 A | 3/1985 | Smit et al. |
| 4,642,017 A | 2/1987 | Fenn |

(Continued)

FOREIGN PATENT DOCUMENTS

| | | |
|---|---|---|
| CA | 1072919 | 3/1980 |
| CA | 2584306 | 3/2007 |

(Continued)

OTHER PUBLICATIONS

Boni, Martin; Restriction Requirement for U.S. Appl. No. 14/396,206, filed Oct. 17, 2014, dated Feb. 16, 2016, 6 pgs.

(Continued)

*Primary Examiner* — Alexander S Thomas
(74) *Attorney, Agent, or Firm* — Taylor English Duma LLP (57) ABSTRACT

An arrangement of coils of varying widths and diameters in a warehouse having an automated crane wherein: the coil axes are parallel; the coils are arranged in lines, the coil widths in each line falling within a first predetermined range associated with the line, the coil diameters in each line falling within a second predetermined range associated with the line and the coil axes in each line being orientated perpendicularly to said each line; the lines define (i) rows of coils; (ii) a bottom layer of coils; and (iii) one or more upper layers of coils; each upper layer coil is supported by a pair (Continued)

of lower layer coils in a line; the first and second predetermined ranges associated with the line in which said each coil is arranged are the same as those associated with the line in which the supporting coils are arranged.

3 Claims, 7 Drawing Sheets

(51) Int. Cl.
*B65G 59/02* (2006.01)
*B66C 13/18* (2006.01)
*B66C 17/06* (2006.01)

(56) References Cited

U.S. PATENT DOCUMENTS

| | | | |
|---|---|---|---|
| 4,796,209 | A | 1/1989 | Burk |
| 9,522,783 | B2 | 12/2016 | Boni |
| 9,828,193 | B2 | 11/2017 | Boni et al. |
| 2005/0226713 | A1 | 10/2005 | Tsafaridis |
| 2006/0104800 | A1 | 5/2006 | Armbruster |
| 2007/0007354 | A1 | 1/2007 | Mueller |
| 2007/0039909 | A1* | 2/2007 | DeMent ............... B60P 7/12 211/59.4 |
| 2008/0255699 | A1 | 10/2008 | Hama et al. |
| 2011/0315765 | A1 | 12/2011 | Schantz et al. |
| 2012/0179632 | A1 | 7/2012 | Pienta et al. |
| 2015/0166272 | A1 | 6/2015 | Pankratov |
| 2015/0298907 | A1 | 10/2015 | Boni |
| 2017/0081136 | A1 | 3/2017 | Boni |

FOREIGN PATENT DOCUMENTS

| | | |
|---|---|---|
| CA | 2795624 | 5/2014 |
| CA | 2802429 | 7/2014 |
| CA | 2807309 | 7/2014 |
| DE | 202005020657 | 6/2006 |
| EP | 0659660 | 6/1995 |
| EP | 1577231 | 9/2005 |
| FR | 2689904 | 6/1992 |
| JP | 2000255785 | 9/2000 |
| JP | 2008195535 | 8/2008 |
| WO | 0214203 | 2/2002 |
| WO | 2008119885 | 10/2008 |
| WO | 2011131836 | 10/2011 |
| WO | 2013059366 | 4/2013 |
| WO | 2014066989 | 5/2014 |

OTHER PUBLICATIONS

Tsafaridis, Demetrius; International Search Report and Written Opinion for PCT/CA2013/000329, filed Apr. 5, 2013, dated Jul. 18, 2013, 4 pgs.
Tsafaridis, Demetrius; U.S. Provisional Application entitled: Warehouse-Related Method, having U.S. Appl. No. 61/721,865, filed Nov. 2, 2012, 39 pgs.
Boni, Martin; International Search Report and Written Opinion for PCT/CA2013/000935, filed Nov. 1, 2013, dated Feb. 18, 2014, 5 pgs.
Boni, Martin; U.S. Provisional Application entitled: Warehouse-Related Method and Facility, having U.S. Appl. No. 61/835,800, filed Jun. 17, 2013, 52 pgs.
Boni, Martin; U.S. Provisional Application entitled: Warehouse-Related Method and Facility, having U.S. Appl. No. 61/897,289, filed Oct. 30, 2013, 49 pgs.
Boni, Martin; International Preliminary Report on Patentability for PCT/CA2013/000936, filed Nov. 1, 2013, dated May 5, 2015, 7 pgs.
Boni, Martin; Issue Notification for U.S. Appl. No. 14/395,206, filed Oct. 17, 2014, dated Nov. 30, 2016, 1 pg.
Boni, Martin; Notice of Allowance for U.S. Appl. No. 14/395,206, filed Oct. 17, 2014, dated Aug. 22, 2016, 10 pgs.
Boni, Martin; International Preliminary Report on Patentability for PCT Application No. PCT/CA2015/050388, filed Apr. 30, 2015, dated Nov. 15, 2018, 4 pgs.
Boni, Martin; International Search Report and Written Opinion for PCT Application No. PCT/CA2015/050388, filed Apr. 30, 2015, dated Jul. 18, 2015, 6 pgs.
Carego Innovative Solutions, Inc.; Extended European Search Report for serial No. 13851586.1, filed Nov. 1, 2013, dated Sep. 28, 2016, 12 pgs.
Boni, Martin; Notice of Allowance for U.S. Appl. No. 15/311,094, filed Nov. 14, 2016, dated Jun. 29, 2017, 25 pgs.
Boni, Martin; Issue Notification for U.S. Appl. No. 15/311,094, filed Nov. 14, 2016, dated Nov. 8, 2017, 1 pg.
Boni, Martin; Non-Final Office Action for U.S. Appl. No. 14/395,206, filed Oct. 17, 2014, dated Apr. 20, 2016, 19 pgs.

\* cited by examiner

METHOD FOR ARRANGING COILS IN A WAREHOUSE

FIELD

The field of the invention relates to warehousing.

BACKGROUND OF THE INVENTION

It is well known for coiled material, such as coils of steel, to be stored in a warehouse, and in stacks of coils two or more high. It is also well known for materials to be transported autonomously. However, it is not well known for coils to be autonomously stored in stacks of coils two or more high.

SUMMARY OF THE INVENTION

Forming one aspect of the invention is an arrangement of a plurality of coils of varying widths and diameters in a warehouse having an automated overhead crane, the overhead crane having a trolley-mounted hoist that traverses a supporting beam and a pair of rails traversed by the supporting beam, In the arrangement:
  the coil axes are parallel to one another
    the coils are arranged in lines, the widths of the coils in each line falling within a first predetermined range associated with the line, the diameters of the coils in each line falling within a second predetermined range associated with the line and the axes of the coils in each line being orientated perpendicularly to said each line
    the lines of coils being arranged to define (i) rows of coils; (ii) a bottom layer of coils; and (iii) one or more upper layers or coils,
    in respect of each coil in the one or more upper layers, said each coil is supported by a pair of adjacent coils in a line in a lower layer and
    the first and second predetermined ranges associated with the line in which said each coil is arranged are the same as those associated with the line in which the coils supporting said each coil are arranged.

According to another aspect of the invention, the rows of coils are spaced apart from one another by a predetermined clearance distance associated with the clearance of the overhead crane.

According to another aspect of the invention, in respect of each line of coils, the coil axes are spaced apart by a multiple of a predetermined spacing distance associated with the second predetermined range associated with said each line.

According to another aspect of the invention, in respect of each line of coils, the predetermined spacing distance is associated with the upper limit of the second predetermined range associated with said each line.

According to another aspect of the invention, in respect of each line of coils, the predetermined spacing distance is the sum of a constant and the upper limit of the predetermined range of diameters associated with said each line.

According to another aspect of the invention, the constant is one and the same for all lines.

According to another aspect of the invention, the constant is 2" and the coils in each line have diameters that differ by no more than 1".

According to another aspect of the invention, the lines of coils are parallel to the supporting beam and the coil axes are parallel to the rails.

Forming another aspect of the invention is a method for arranging a plurality of coils of varying widths and diameters in a warehouse having an automated overhead crane, the overhead crane having a trolley-mounted hoist that traverses a supporting beam and a pair of rails traversed by the supporting beam The method comprises an associating step, a defining step, a placement step and an arrangement step.

Association Step

In this step, associating each of the plurality of coils with one of a plurality of types such that, in respect of each type, the associated coils each have a width that falls within a first predetermined range associated with said each type and a diameter that falls within a second predetermined range associated with said each type.

Defining Step

In this step, for each coil type, defining, in the warehouse, an associated zone, the zone being defined by one or more areas on the warehouse floor, said one or more areas calculated to be sufficiently large to receive at least a number of notional coils associated with said each coil type, the number of notional coils being at least the number of coils associated with said each coil type, the notional coils having a notional width equal to the upper limit of the first predetermined range associated with said each type and having a notional diameter equal to the upper limit of the second predetermined range associated with said each type, the calculations assuming that, in respect of each coil type:
  the associated notional coils are arranged in one or more notional lines, the axes of the associated notional coils being parallel to one another and perpendicular to the notional lines and, in respect of each line, the ends of the notional coils being coplanar
  the associated notional coil axes are spaced apart by a multiple of a predetermined distance associated with the second predetermined range associated with said each type
  the notional lines of coils are arranged to define a bottom layer of notional coils and an upper layer of notional coils
  each notional coil in a layer other than the bottom layer is supported by adjacent notional coils in the bottom layer, the ends of the supported and supporting notional coils being coplanar; and
  at least two notional coils in the bottom layer support no other notional coils; or at least four notional coils in the bottom layer support no more than one notional coil; or space for a notional coil remains in the bottom layer.

The zones are defined such that, in the calculation: the notional coils define spaced-apart rows of notional coils; and at least a minimum predetermined clearance distance is provided between the notional coils in adjacent rows.

Placement Step

In this step, there are placed, in each zone, a number of portable coil cradles equal at least to the lesser of (i) the number of coils associated with that type; and (ii) the number of notional bottom coils defined in the associated zone.

Arrangement Step

In this step, the coils are arranged such that:
  each coil is disposed in the zone provided for the type of coil with which said each coil is associated;
  the coils form lines, the axes of the coils being parallel to one another and perpendicular to the lines; in respect of each line, the coil ends are substantially coplanar and the coil axes are spaced apart by a multiple of a predetermined distance associated with the second predetermined range associated with said each type;

the lines of coils define a bottom layer of coils and one or more upper layers of coils, each coil in the bottom layer being supported by a respective one of the portable cradles, each coil in the one or more upper layers being supported by adjacent coils in the layer beneath and the ends of the supported and supporting coils being substantially coplanar;

at least two coils in the bottom layer support no other coils; or at least four coils in the bottom layer support no more than one coil; or space for a coil remains in the bottom layer;

the coils define spaced-apart rows of coils; and at least a minimum predetermined clearance distance is provided between the coils in adjacent rows.

According to another aspect of the invention, the predetermined clearance distance can be associated with the clearance of the overhead crane.

According to another aspect of the invention, in respect of each line of coils, the coil axes can be spaced apart by a multiple of a predetermined spacing distance associated with the second predetermined range associated with the type of coils forming said each line.

According to another aspect of the invention, the predetermined spacing distance can be associated with the upper limit of the second predetermined range associated with the type of coils forming said each line.

According to another aspect of the invention, in respect of each line, the predetermined spacing distance can be the sum of a constant and the upper limit of the second predetermined range associated with the type of coils forming said each line.

According to another aspect of the invention, the constant is one and the same for all lines.

According to another aspect of the invention, the constant can be 2" and the coils in each line can have diameters that differ by no more than 1".

According to another aspect of the invention, the lines of coils are parallel to the supporting beam and the coil axes can be parallel to the rails.

According to another aspect of the invention, the coils can be arranged by the automated crane, each coil being placed autonomously by the automated crane in a manner wherein the speed of the coil transport is maximized as the coil travels through the warehouse and as the coil is lowered by the hoist to a predetermined elevation and thereafter the speed of the coil transport is reduced to the point that no damage is suffered, the predetermined elevation being calculated as a function of the diameter of the coil.

According to another aspect of the invention, the predetermined elevation can be calculated as a function of the diameter of the coil, the diameter itself being calculated as a function of the coil mass, coil thickness and coil width.

According to another aspect of the invention, the predetermined elevation can be calculated as function of the diameter of the coil and the diameters of supporting coils, if any, the diameter of the supporting coils being assumed to be within the second predetermined range associated with the type of coil.

Forming yet another aspect of the invention is a method for use with a row of coils in a warehouse having an automated overhead crane. The overhead crane has a trolley-mounted hoist that traverses a supporting beam and a pair of rails traversed by the supporting beam, the coils in the row being arranged in a lower layer and one or more upper layers. The row of coils includes a coil to be retrieved being disposed such that no other coils are supported thereby in the row.

This method comprises the steps of:

calculating the position of the core of the coil to be retrieved as a function of the diameter of the coil to be retrieved; and providing for the autonomous retrieval of the coil to be retrieved via the overhead crane using the calculated core position.

According to another aspect of the invention, the position of the coil to be retrieved is calculated as a function of the diameter of the coil to be retrieved, the diameter itself being calculated as a function of the coil mass, coil thickness and coil width.

According to another aspect of the invention, the position of the coil to be retrieved can be calculated as a function of the diameter of the coil to be retrieved and the diameter of the supporting coils, the diameter of the supporting coils being assumed to be within a predetermined range associated with the type of coil to be retrieved

DETAILED DESCRIPTION

A method according to an exemplary embodiment of the invention is hereinafter described in detail.

As an initial matter, it will be understood that the method is a warehousing method for use with a plurality of coils and a plurality of cradles. The warehouse is of a known type having an overhead crane (not shown). The overhead crane has a trolley-mounted hoist that traverses a supporting beam and a pair of rails traversed by the supporting beam, and is capable of autonomous operation, i.e. capable of:

travelling to a location whereat a coil is understood to reside if a coil is at the location, grasping the coil; and transporting the coil to another location.

The coils are of:

varying widths, i.e. the distance between the ends of the coil when measured in the direction of the coil axis varies from coil to coil; and varying diameter Each cradle is adapted to support a respective one of the coils such that the coil axis is horizontal.

The method is for arranging the coils in the warehouse and broadly defined, the method involves an associating step, a defining step, a placing step and an arranging step.

In the associating step, each of the plurality of coils is associated with one of a plurality of types such that, in respect of each type, the associated coils each have a width that falls within a first predetermined range associated with said each type and a diameter that falls within a second predetermined range associated with said each type.

In the defining step, a subzone is defined for and associated with each coil type in the warehouse.

Also defined in the defining step for and associated with each coil type is a notional coil. The notional coil associated with each coil type has a notional width equal to the upper limit of the first predetermined range associated with the coils of said each type and has a notional diameter equal to the upper limit of the second predetermined range associated with said each type. Thus, for a coil type encompassing widths between 60" and 66" and encompassing diameters between 40" and 41", the notional coil would have a notional width of 66" and a notional diameter of 41".

The subzone for each coil type is defined by one or more areas on the warehouse floor, said one or more areas being calculated to be sufficiently large to receive at least a number of the notional coils associated with said each coil type that is equal to the number of coils of that type on hand. Thus, if the inventory of coils to be arranged includes nine (9) coils falling within the type encompassing widths between 58" and 64" and encompassing diameters between 40" and 41", the subzone will be large enough to house nine (9) notional coils having a notional width of 64" and a notional diameter of 41".

The packing methodology by which the notional coils are assumed to occupy the subzones assumes for the purpose of the calculation contemplates that, in respect of each coil type:

- the associated notional coils are arranged in one or more notional lines that lie parallel to the supporting beam
- the coil axes are parallel to the rails
- in each line, the coil axes are parallel to one another, the notional coil ends are coplanar and the notional coil axes are spaced apart by a multiple of a predetermined distance associated with the second predetermined range associated with said each type
- the notional lines of coils are arranged to define a bottom layer of notional coils and an upper layer of notional coils
- each notional coil in a layer other than the bottom layer is supported by adjacent notional coils in the bottom layer, the ends of the supported and supporting notional coils being coplanar; and
- at least two notional coils in the bottom layer support no other notional coils; or at least four notional coils in the bottom layer support no more than one notional coil; or space for a notional coil remains in the bottom layer The predetermined spacing distance is associated with the second predetermined range associated with the type of notional coils forming said each notional line, more specifically, the predetermined distance is the sum of a constant and the upper limit of the second predetermined range associated with the type of notional coils forming said each line, the constant being one and the same for all lines. The predetermined distance is sufficiently narrow as to enable coils to be stacked upon one another in two or more levels and sufficiently broad as to ensure that, irrespective of the diameter of the coils being stacked [all coils being of the same type], the coils do not bridge one another [which would cause damage].

Figure 1:
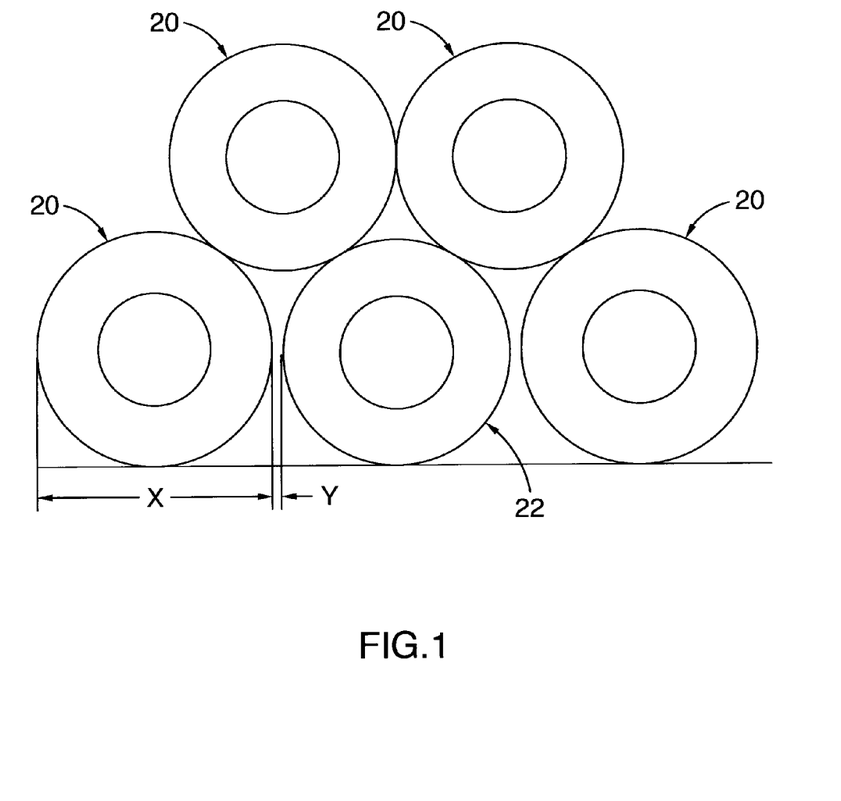
FIG. 1 illustrates a group of coils in a limit condition.

With further regard to the predetermined distance, reference is made to FIG. 1 which shows a group of coils in a limit condition. Coils 20 have an OD of 38"; coil 22 has an OD of 36.9"; Y is 2.55" and X is 40". This drawing illustrates that, wherein the constant is 2" [i.e. spacing between the centres of adjacent coils is $2"+OD_{max}$], $OD_{min}$ is 36.9". To state it yet another way, if the maximum differential in coil OD in a respective coil type is maintained at less than 1.1", then a 2" spacing constant will avoid bridging. This calculation changes slightly with coil sizes but it has been found that for coils having an OD between 24" and 70", maintenance of a maximum 1" OD differential in each coil type and a 2" spacing constant avoids bridging at all times.

The subzones are defined in the warehouse such that:
- the notional coils define spaced-apart rows of notional coils;
- notional coils of the most common types generally are placed nearer the loading areas and notional coils of the most uncommon types generally are placed further from the loading areas
- notional coils are generally grouped by the first predetermined range
- at least a minimum predetermined clearance distance is provided between the notional coils in adjacent rows, this distance being associated with the clearance of the overhead crane, i.e. the distance between the rows of notional coils is such that it would permit the overhead crane to traverse the rows and manipulate the coils.

The foregoing arrangement will be understood to be advantageous in that: (1) coil movement activity will normally be more commonplace in the context of coils of popular types; thus, the placement of these coils near the loading bay expedites movement; and (2) in areas where large subzones are created, i.e. where large numbers of similar coils are on hand or expected, the likelihood of the need for the creation of a new subzone is relatively small, whereas in the context of relatively "rare" coil types, the chance of significant variance in length heightens [i.e. if a subzone contains only a couple of coils, the removal of those coils opens up the potential for an entirely new subzone; (3) grouping the coils together by the first predetermined range tends to reduce wasted space, i.e. space would be wasted if coils having large widths were commonly stored alongside coils having narrow widths.

In the placement step, for each type of coil, a number of portable coil cradles equal at least to the lesser of (i) the number of coils associated with that type; and (ii) the number of notional bottom coils defined in the associated subzone, are operatively placed in the areas defined on the warehouse floor.

In the arrangement step, the physical coils are arranged such that:
- each coil is disposed in the subzone provided for the type of coil with which said each coil is associated
- the coils form lines parallel to the supporting beam, the axes of the coils being parallel to one another and to the rails and perpendicular to the lines
- in respect of each line, the coil ends are substantially coplanar and the coil axes are spaced apart by a multiple of a predetermined distance associated with the second predetermined range associated with said each type
- the lines of coils define a bottom layer of coils and one or more upper layers of coils
- each coil in the bottom layer is supported by a respective one of the portable cradles
- each coil in the one or more upper layers is supported by adjacent coils in the layer beneath, the ends of the supported and supporting coils being substantially coplanar; and
- at least two coils in the bottom layer support no other coils; or at least four coils in the bottom layer support no more than one coil; or space for a coil remains in the bottom layer.

The coils are arranged by the automated crane, each coil being placed autonomously by the automated crane:

into the subzone provided for the type of coil with which said each coil is associated;

in the bottom layer, if space exists; and in a manner wherein the speed of the coil transport is maximized as the coil travels through the warehouse and as the coil is lowered by the hoist to a predetermined elevation and thereafter the speed of the coil transport is reduced to the point that no damage is suffered, the predetermined elevation being calculated as a function of the diameter of the coil.

A prophetic example is hereinafter described in detail with reference to the Tables reproduced below and the Figures.

Figure 2:
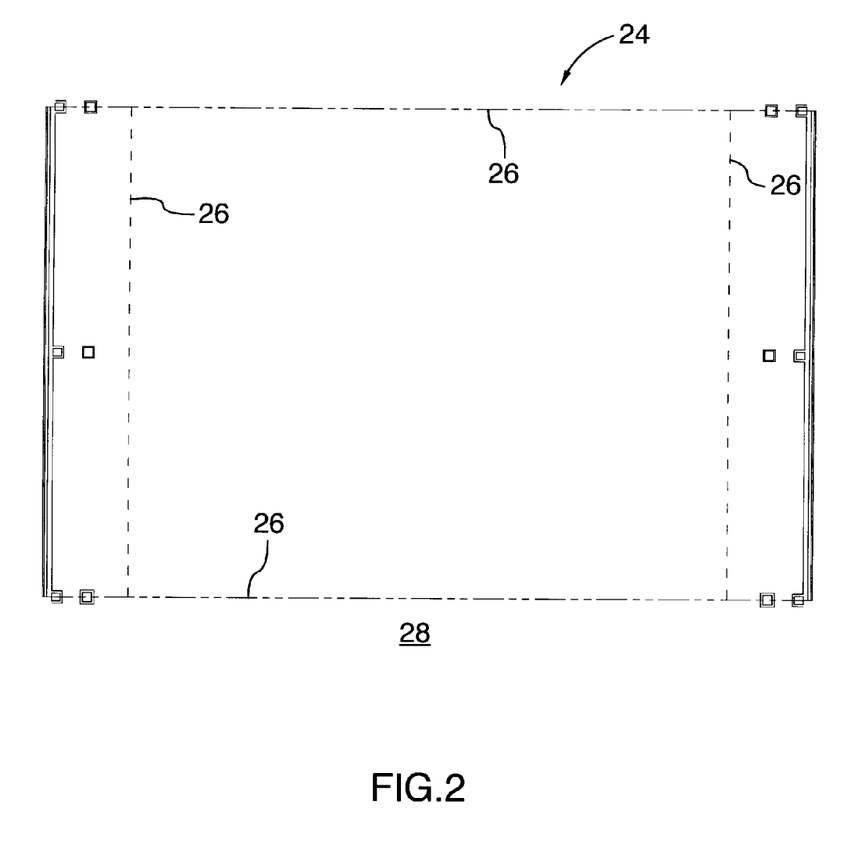
FIG. 2 illustrates the layout of an exemplary warehouse.

FIG. 2 shows the layout and square footage of an exemplary warehouse 24. The limits of the hoist travel are defined by dashed lines 26. The loading bay is indicated by area 28.

TABLE 1 reproduced below, shows a hypothetic inventory of coils.

| COIL No | Gauge | Width | Weight (lbs) | OD (inch) |
|---|---|---|---|---|
| XK13160540 | 0.63 | 49.21 | 6658 | 31.52 |
| XK13160570 | 0.63 | 49.21 | 6658 | 31.52 |
| XK11300410 | 0.63 | 49.21 | 6703 | 31.58 |
| XK13180620 | 0.65 | 49.21 | 6857 | 31.79 |
| ANL490A | 0.63 | 49.21 | 6914 | 31.87 |
| XK0C280190 | 0.65 | 48.43 | 11553 | 38.03 |
| XK0C280290 | 0.65 | 48.43 | 11663 | 38.16 |
| XK0C280250 | 0.65 | 48.43 | 11839 | 38.37 |
| 245967 | 0.85 | 49.21 | 12069 | 38.41 |
| F0K0430C04 | 0.465 | 47.56 | 13074 | 40.07 |
| F0H0537C01 | 0.465 | 47.56 | 13096 | 40.09 |

TABLE 1-continued reproduced below, shows a hypothetic inventory of coils.

| COIL No | Gauge | Width | Weight (lbs) | OD (inch) |
|---|---|---|---|---|
| F0I0560C03 | 0.465 | 47.56 | 13096 | 40.09 |
| F0J0428C01 | 0.465 | 47.56 | 13096 | 40.09 |
| 110205375001C | 0.85 | 59.06 | 16425 | 40.24 |
| 110205356001C | 0.75 | 59.06 | 16425 | 40.24 |
| 110205376001C | 0.85 | 59.06 | 16425 | 40.24 |
| 110205352001C | 0.75 | 59.06 | 16425 | 40.24 |
| 110205375002C | 0.85 | 59.06 | 16425 | 40.24 |
| JKFK0AC | 0.70 | 39.37 | 14273 | 44.60 |
| JLAG3B | 0.70 | 39.37 | 14286 | 44.62 |
| JLFN9BA | 0.85 | 39.37 | 14286 | 44.62 |
| AB762C | 0.48 | 39.37 | 14286 | 44.62 |
| BPY379A | 0.40 | 39.37 | 14291 | 44.63 |
| 006452D1L | 0.70 | 59.06 | 32045 | 52.72 |
| 006392D1L | 0.75 | 59.06 | 32056 | 52.73 |
| 006422D1L | 0.75 | 59.06 | 32111 | 52.76 |
| 010692D1L | 0.90 | 59.06 | 32177 | 52.81 |
| 006482D1L | 0.70 | 59.06 | 32188 | 52.82 |
| 0PB348A00 | 1.45 | 49.61 | 32320 | 57.07 |
| 0PB351A00 | 1.45 | 49.61 | 32342 | 57.08 |
| 0PB349A00 | 1.45 | 49.61 | 32386 | 57.12 |
| 01L040X00 | 2.45 | 49.02 | 41679 | 64.75 |
| 16L392A00 | 1.25 | 43.31 | 37424 | 64.72 |
| 09M740X00 | 1.25 | 43.31 | 37479 | 64.76 |
| 09M742X00 | 1.25 | 43.31 | 37578 | 64.84 |
| 9CM667X00 | 1.55 | 43.31 | 37600 | 64.86 |
| 09M741X00 | 1.25 | 43.31 | 37600 | 64.86 |
| 09M735X00 | 1.25 | 43.31 | 37600 | 64.86 |
| 09M730X00 | 1.25 | 43.31 | 37666 | 64.91 |
| 01L039X00 | 2.45 | 49.02 | 42969 | 65.14 |
| 01L037X00 | 2.45 | 49.02 | 43002 | 65.17 |

TABLE 2 reproduced below, shows the result of the association step, with the first predetermined range between 6″ and the second predetermined range being 1″

| COIL No | Gauge | Width | Weight (lb) | OD (in) | OD Subclass | Width subclass |
|---|---|---|---|---|---|---|
| XK13160540 | 0.63 | 49.21 | 6658 | 31.52 | 32 | D |
| XK13160570 | 0.63 | 49.21 | 6658 | 31.52 | 32 | D |
| XK11300410 | 0.63 | 49.21 | 6703 | 31.58 | 32 | D |
| XK13180620 | 0.65 | 49.21 | 6857 | 31.79 | 32 | D |
| ANL490A | 0.63 | 49.21 | 6914 | 31.87 | 32 | D |
| XK0C280190 | 0.65 | 48.43 | 11553 | 38.03 | 38 | D |
| XK0C280290 | 0.65 | 48.43 | 11663 | 38.16 | 38 | D |
| XK0C280250 | 0.65 | 48.43 | 11839 | 38.37 | 38 | D |
| 245967 | 0.85 | 49.21 | 12069 | 38.41 | 38 | D |
| F0K0430004 | 0.465 | 47.56 | 13074 | 40.07 | 40 | D |
| F0H0537C01 | 0.465 | 47.56 | 13096 | 40.09 | 40 | D |
| F0I0560003 | 0.465 | 47.56 | 13096 | 40.09 | 40 | D |
| F0J0428C01 | 0.465 | 47.56 | 13096 | 40.09 | 40 | D |
| 110205375001C | 0.85 | 59.06 | 16425 | 40.24 | 40 | F |
| 110205356001C | 0.75 | 59.06 | 16425 | 40.24 | 40 | F |
| 110205376001C | 0.85 | 59.06 | 16425 | 40.24 | 40 | F |
| 110205352001C | 0.75 | 59.06 | 16425 | 40.24 | 40 | F |
| 110205375002C | 0.85 | 59.06 | 16425 | 40.24 | 40 | F |
| JKFK0AC | 0.70 | 39.37 | 14273 | 44.60 | 45 | B |
| JLAG3B | 0.70 | 39.37 | 14286 | 44.62 | 45 | B |
| JLFN9BA | 0.85 | 39.37 | 14286 | 44.62 | 45 | B |
| AB762C | 0.48 | 39.37 | 14286 | 44.62 | 45 | B |
| BPY379A | 0.40 | 39.37 | 14291 | 44.63 | 45 | B |
| 006452D1L | 0.70 | 59.06 | 32045 | 52.72 | 53 | F |
| 006392D1L | 0.75 | 59.06 | 32056 | 52.73 | 53 | F |
| 006422D1L | 0.75 | 59.06 | 32111 | 52.76 | 53 | F |
| 010692D1L | 0.90 | 59.06 | 32177 | 52.81 | 53 | F |
| 006482D1L | 0.70 | 59.06 | 32188 | 52.82 | 53 | F |
| 0PB348A00 | 1.45 | 49.61 | 32320 | 57.07 | 57 | D |
| 0PB351A00 | 1.45 | 49.61 | 32342 | 57.08 | 57 | D |
| 0PB349A00 | 1.45 | 49.61 | 32386 | 57.12 | 57 | D |
| 01L040X00 | 2.45 | 49.02 | 41679 | 64.75 | 65 | D |
| 16L392A00 | 1.25 | 43.31 | 37424 | 64.72 | 65 | C |
| 09M740X00 | 1.25 | 43.31 | 37479 | 64.76 | 65 | C |

TABLE 2-continued reproduced below, shows the result of the association step, with the first predetermined range between 6" and the second predetermined range being 1"

| COIL No | Gauge | Width | Weight (lb) | OD (in) | OD Subclass | Width subclass |
|---|---|---|---|---|---|---|
| 09M742X00 | 1.25 | 43.31 | 37578 | 64.84 | 65 | C |
| 9CM667X00 | 1.55 | 43.31 | 37600 | 64.86 | 65 | C |
| 09M741X00 | 1.25 | 43.31 | 37600 | 64.86 | 65 | C |
| 09M735X00 | 1.25 | 43.31 | 37600 | 64.86 | 65 | C |
| 09M730X00 | 1.25 | 43.31 | 37666 | 64.91 | 65 | C |
| 01L039X00 | 2.45 | 49.02 | 42969 | 65.14 | 65 | D |
| 01L037X00 | 2.45 | 49.02 | 43002 | 65.17 | 65 | D |

For ready reference, each subzone in the table above is an alpha numeric: the alphabetic represents a zone defined by the first predetermined range [width, where A is 28-34", B is 34-40", etc.] and the numeric is indicative of the second predetermined range [32 is 32±0.5", 33 is 33±0.5", etc.]

TABLE 3 reproduced below, shows an interim stage of the defining step, wherein the coils are grouped.

| | Class | | | | | | |
|---|---|---|---|---|---|---|---|
| Subclass | A (28-34) | B (34-40) | C (40-46) | D (46-52) | E (52-58) | F (58-64) | G (64-70) |
| 32 | 0 | 0 | 0 | 5 | 0 | 0 | 0 |
| 33 | 0 | 0 | 0 | 0 | 0 | 0 | 0 |
| 34 | 0 | 0 | 0 | 0 | 0 | 0 | 0 |
| 35 | 0 | 0 | 0 | 0 | 0 | 0 | 0 |
| 36 | 0 | 0 | 0 | 0 | 0 | 0 | 0 |
| 37 | 0 | 0 | 0 | 0 | 0 | 0 | 0 |
| 38 | 0 | 0 | 0 | 4 | 0 | 0 | 0 |
| 39 | 0 | 0 | 0 | 0 | 0 | 0 | 0 |
| 40 | 0 | 0 | 0 | 4 | 0 | 5 | 0 |
| 41 | 0 | 0 | 0 | 0 | 0 | 0 | 0 |
| 42 | 0 | 0 | 0 | 0 | 0 | 0 | 0 |
| 43 | 0 | 0 | 0 | 0 | 0 | 0 | 0 |
| 44 | 0 | 0 | 0 | 0 | 0 | 0 | 0 |
| 45 | 0 | 5 | 0 | 0 | 0 | 0 | 0 |
| 46 | 0 | 0 | 0 | 0 | 0 | 0 | 0 |
| 47 | 0 | 0 | 0 | 0 | 0 | 0 | 0 |
| 48 | 0 | 0 | 0 | 0 | 0 | 0 | 0 |
| 49 | 0 | 0 | 0 | 0 | 0 | 0 | 0 |
| 50 | 0 | 0 | 0 | 0 | 0 | 0 | 0 |
| 51 | 0 | 0 | 0 | 0 | 0 | 0 | 0 |
| 52 | 0 | 0 | 0 | 0 | 0 | 0 | 0 |
| 53 | 0 | 0 | 0 | 0 | 0 | 5 | 0 |
| 54 | 0 | 0 | 0 | 0 | 0 | 0 | 0 |
| 55 | 0 | 0 | 0 | 0 | 0 | 0 | 0 |
| 56 | 0 | 0 | 0 | 0 | 0 | 0 | 0 |
| 57 | 0 | 0 | 0 | 3 | 0 | 0 | 0 |
| 58 | 0 | 0 | 0 | 0 | 0 | 0 | 0 |
| 59 | 0 | 0 | 0 | 0 | 0 | 0 | 0 |
| 60 | 0 | 0 | 0 | 0 | 0 | 0 | 0 |
| 61 | 0 | 0 | 0 | 0 | 0 | 0 | 0 |
| 62 | 0 | 0 | 0 | 0 | 0 | 0 | 0 |
| 63 | 0 | 0 | 0 | 0 | 0 | 0 | 0 |
| 64 | 0 | 0 | 0 | 0 | 0 | 0 | 0 |
| 65 | 0 | 0 | 7 | 3 | 0 | 0 | 0 |
| TOTALS | 0 | 5 | 7 | 19 | 0 | 10 | 0 |

TABLE 4 reproduced below, shows another interim stage, wherein warehouse space is allocated based on the greater of coils in inventory and average number of coils in inventory.

| Class | Subclass | In Inventory | Average Spots | Actual Spots | Free Spots |
|---|---|---|---|---|---|
| B | 45 | 5 | 9 | 11 | 4 |
| C | 65 | 7 | 5 | 9 | 0 |
| D | 32 | 5 | 0 | 7 | 0 |
| | 38 | 4 | 4 | 6 | 0 |

TABLE 4-continued reproduced below, shows another interim stage, wherein warehouse space is allocated based on the greater of coils in inventory and average number of coils in inventory.

| Class | Subclass | In Inventory | Average Spots | Actual Spots | Free Spots |
|-------|----------|--------------|---------------|--------------|------------|
|       | 40       | 4            | 5             | 7            | 1          |
|       | 57       | 3            | 12            | 14           | 9          |
|       | 65       | 3            | 3             | 5            | 0          |
| F     | 40       | 5            | 8             | 10           | 3          |
|       | 53       | 5            | 0             | 7            | 0          |

Herein, it will be seen that, for each subzone [defined by a class and subclass] space is allocated on the warehouse floor assuming a number of notional spots [Actual spots] that is 2 greater than the greater of the number of coils in inventory and the average number of coils in inventory. This ensures that there are always two open spots in each zone for the reasons indicated earlier, namely, so as to ensure that, when a coil in the lower layer needs to be retrieved, that coil being disposed beneath one or more other coils in a stack, there is room nearby to temporarily store the supported coils as the coil to be retrieved is unearthed. This adds to efficiencies within the warehouse.

For greater certainty, it will be appreciated that the concept of "two open spaces" in the context of two layers of coils is embodied by the following relationship in respect of each zone: at least two coils in the bottom layer support no other coils; or at least four coils in the bottom layer support no more than one coil; or space for a coil remains in the bottom layer.

With regard to the "average" number of coils on hand in inventory, persons of ordinary skill in the statistical arts can generate an "average" number of coils in inventory based on historic norms and trends using a multitude of conventional statistical tools. This prediction forms no part of the present invention and accordingly is not described in detail.

Figure 3:
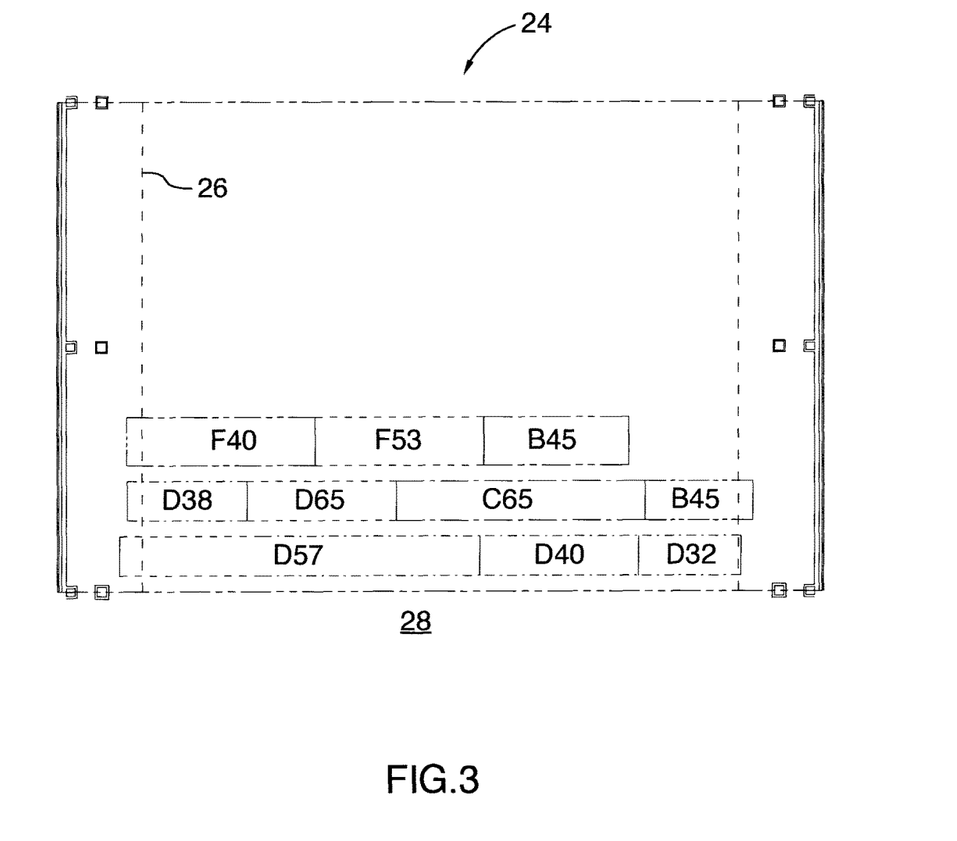
FIG. 3 illustrates subzones defined on a warehouse floor.

FIG. 3 shows the subzones defined on the warehouse floor, with each boundary labelled with the appropriate subzone.

The placement of the subzones on the warehouse floor can be explained as follows:

Class D has the largest number of spots associated therewith, and in class D, the largest number of spots is associated with D57. Thus, the subzone associated with D57 is situate in the row nearest the loading bay 28.

D32 and D40 are the next largest subzones, each encompassing 7 spots, but D40 is historically larger than D32. Accordingly, D40 takes priority, and is situated alongside D57; D32 is situated alongside D40. No other coils of any size can fit alongside D32, and thus, this row ends.

The next row is started by D38, being the next largest subzone in class D, encompassing 6 spots, followed by D65, with 5 spots. This completes the placement of subzones of class D.

Room exists alongside D65, and the class next largest in quantity, and of lesser with, than class D, is class C. C65 is thus placed alongside D65. This completes the placement of subzones of class C.

Room exists alongside C65, and the class next largest in quantity, and of lesser with, than class C, is class B. A portion of B45 is thus placed alongside C65. No other coils of any size can fit alongside this portion of the subzone for B45, and thus, this row ends.

The next full row is started with the notional coils of the largest class, by quantity, remaining, namely, Class F. F40 encompasses 10 spots, and thus is placed first, followed by F53. This completes the placement of zones of class F. Room exists alongside F53. The class next largest in quantity, and of lesser with, than class F, is class B. The remainder of B45 is thus placed alongside F53.

Figure 4:
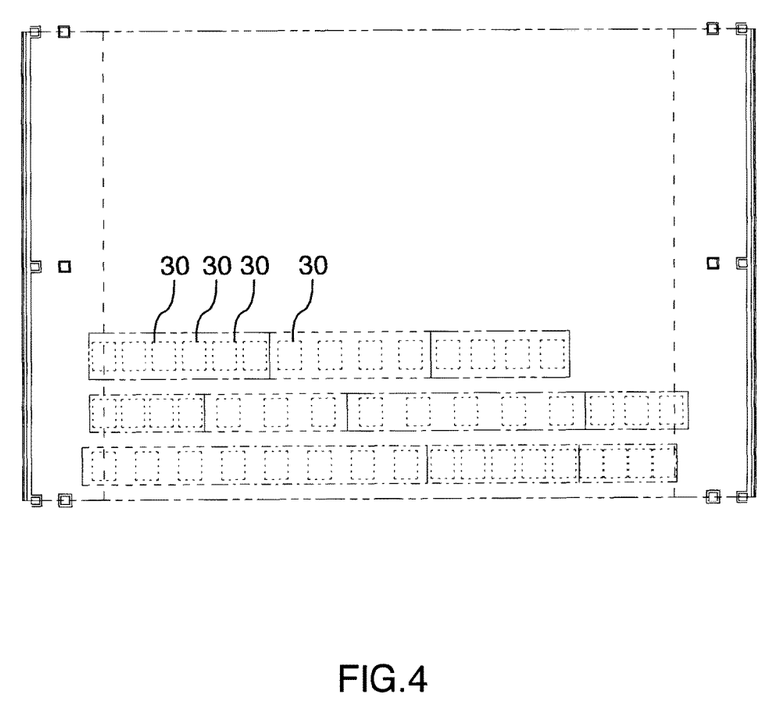
FIG. 4 illustrates the placement of cradles on a warehouse floor.

FIG. 4 shows the cradles 30 following the placing step.

Figure 5:
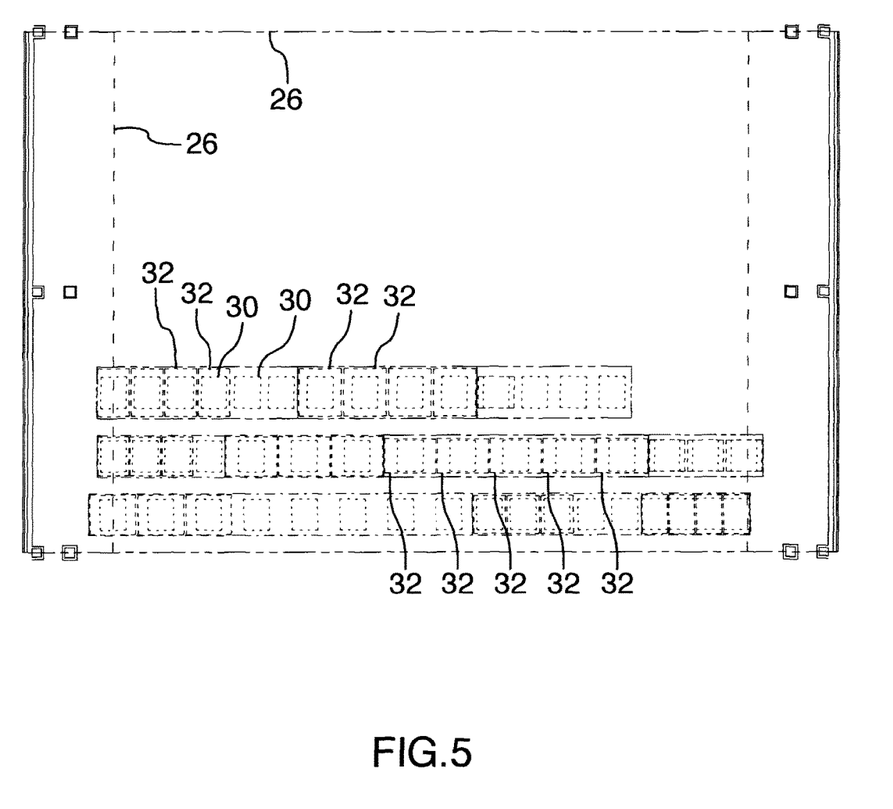
FIG. 5 illustrates the placement a layer of coils on the cradles.

FIG. 5 shows the warehouse floor following the arrangement step, with the second layer of coils not shown, for clarity.

Figure 6:
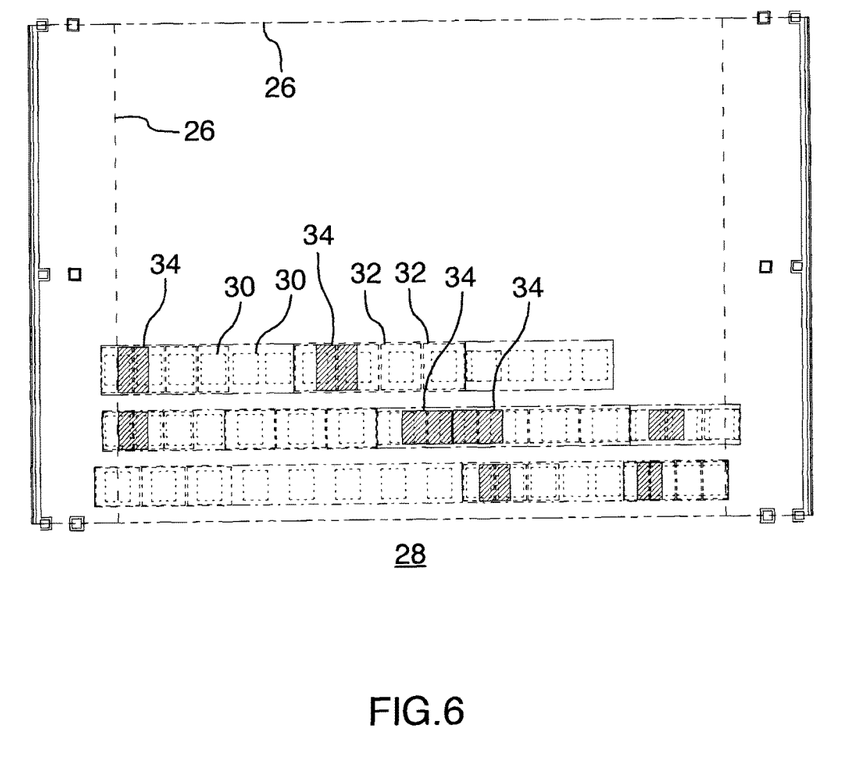
FIG. 6 illustrates the placement of multiple layers of coils on the cradles.

FIG. 6 shows the warehouse floor following the arrangement step: coils in the bottom layer are indicated with reference numeral 32; coils in the upper layer are indicated with reference numeral 34; cradles remain labelled with reference numerals 30. For greater certainty, each of the dashed rectangles that define a zone or part of a zone contains one of the aforementioned lines of coils in the bottom layer and another of the forementioned lines of coils in the top layer.

The aforedescribed method and arrangement provide significant advantages.

One advantage relates to the arrangement of the coils by the automated crane (not shown).

More specifically, the coils can be placed autonomously by the automated crane in a manner wherein the speed of the coil transport is maximized as the coil travels through the warehouse and at the same time, coil damage is minimized.

To do so, the crane autonomously carries each coil, at maximum speed, into position above a desired location and the coil is lowered at maximum speed until the coil reaches a predetermined elevation, at which point, the speed of the hoist is reduced and the coil is lowered at low speed into rest.

The predetermined elevation in respect of each location is a function of:
  the effective height of the cradle
  the diameter of the coil being transported
  the diameter of the supporting coils, if any
  the tolerance of the crane [hoist and trolley]
which ensures that the lower circumference of the coil being deposited does not come into contact with any surface below.

Figure 7:
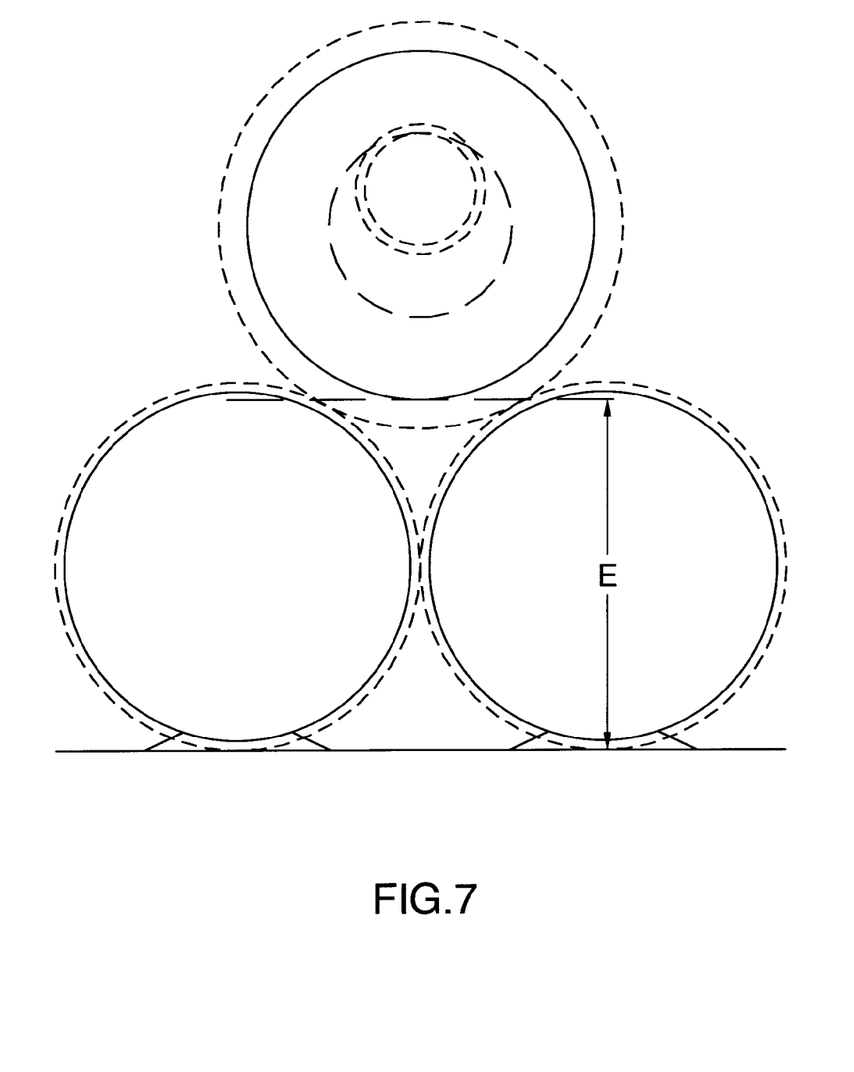
FIG. 7 illustrates the locations of coils as calculated by a crane.

A graphical representation showing the predetermined elevation E is shown as FIG. 7; the solid lines show the locations of the coils as calculated by the crane; the phantom lines indicate the potential for error. It will be seen for the purpose of the calculation that the diameters of the supporting coils are assumed to be the diameter of the notional coils.

Another advantage is associated with the retrieval of a coil.

More specifically, the coils can be retrieved autonomously by the automated crane.

To do so, the crane automatically travels, at maximum speed, into position above the coil to be retrieved. Thereafter, the grapple drops, at maximum speed, until the grapple reaches a predetermined elevation aligned with the position of the core in the coil to be retrieved. At this point, the coil is engaged by the grapple, and the coil is transported to its next location.

This predetermined elevation is again a function of:
  the effective height of the cradle
  the diameter of the coil being retrieved
  the diameter of the supporting coils, if any
  the tolerance of the crane [hoist and trolley]
The predetermined elevation is calculated in an analogous fashion as indicated above, and thus, no further description is provided nor required.

Whereas but a single embodiment is herein described, it will be appreciated that variation is possible.

For example, and without limitation, wherein the illustration shows two layers of coils, it should be understood that the system and method could be used to permit higher stacking. Suitable accommodation would need to be made to the predetermined spacing distance between adjacent coils in each line, to avoid bridging, and as well, the number of open spots in each zone would nominally be increased from two to five.

As well, whereas the space allocation table assumes that the warehouse is large enough to accommodate all coils in inventory and all coils that would normally be inventory, this may not always be the case. In circumstances wherein a warehouse is typically full, and a large allotment of abnormal dimensioned coils arrive, adjustments in spacing would need to be made. Various permutations are of course possible, but one sensible approach would be, in respect of all zones that have "free spots" [i.e. zones that are currently holding fewer coils than the historic, to shrink the zones so that the number of free spots in each zone are reduced proportionally.

Accordingly, the invention should be understood as limited only by the accompanying claims, purposively construed.

The invention claimed is:

1. An arrangement of a plurality of coils in a warehouse having an automated overhead crane, the overhead crane having a trolley-mounted hoist that traverses a supporting beam and a pair of rails traversed by the supporting beam, comprising:
   wherein the plurality of coils have varying widths and diameters and wherein the plurality of coils are positioned so that the coil axes are parallel to one another,
   the coils are arranged in lines, the widths of the coils in each line falling within a first predetermined range associated with the line, the diameters of the coils in each line falling within a second predetermined range associated with the line and the axes of the coils in each line being orientated perpendicularly to each line, and
   the lines of coils being arranged to define (i) rows of coils; (ii) a bottom layer of coils; and (iii) one or more upper layers of coils,
   wherein, in respect of each coil in the one or more upper layers, each coil is supported by a pair of adjacent coils in a line in a lower layer and the first and second predetermined ranges associated with the line in which each coil is arranged are the same as those associated with the line in which the coils supporting each coil are arranged,
   wherein the rows of coils are spaced apart from one another a predetermined clearance distance associated with the clearance of the overhead crane,
   wherein, in respect of each line of coils, the coil axes are spaced apart by a multiple of a predetermined spacing distance associated with the second predetermined range associated with each line, wherein the predetermined spacing distance is associated with the upper limit of the second predetermined range associated with each line, wherein the predetermined spacing distance is the sum of a constant and the upper limit of the second predetermined range associated with each line, and wherein the constant is 2" and the coils in each line have diameters that differ by no more than 1".

2. An arrangement in a warehouse having an automated overhead crane, the overhead crane having a trolley-mounted hoist that traverses a supporting beam and a pair of rails traversed by the supporting beam, the arrangement comprising a plurality of coils of varying widths and diameters, wherein the coil axes are parallel to one another, wherein each coil is associated with one of a plurality of types, each type having a width that falls within a first predetermined range associated with said each type and a diameter that falls within a second predetermined range associated with said each type, wherein the coils are arranged in lines, the coils in each line being of the same type such that the widths of the coils in each line fall within the first predetermined range associated with the type and the diameters of the coils in each line falling within a second predetermined range associated with the type, wherein the axes of the coils in each line being orientated perpendicularly to said each line, wherein the lines of coils being arranged to define (i) rows of coils; (ii) a bottom layer of coils; and (iii) one or more upper layers of coils, wherein, in respect of each coil in the one or more upper layers, said each coil is supported by a pair of adjacent coils in a line in a lower layer and said each coil is of the same type as the coils supporting said each coil such that the first and second predetermined ranges associated with the line in which said each coil is arranged are the same as those associated with the line in which the coils supporting said each coil are arranged, wherein the rows of coils are spaced apart from one another a predetermined clearance distance associated with the clearance of the overhead crane, wherein, in respect of each line of coils, the coil axes are spaced apart by a multiple of a predetermined spacing distance associated with the second predetermined range associated with said each line, wherein, in respect of each line of coils, the predetermined spacing distance is associated with the upper limit of the second predetermined range associated with said each line, wherein, in respect of each line of coils, the predetermined spacing distance is the sum of a constant and the upper limit of the second predetermined range associated with said each line, wherein the constant is the same for all lines, wherein the constant is 2" and the coils in each line have diameters that differ by no more than 1".

3. The arrangement according to claim 2, wherein the lines of coils are parallel to the supporting beam and the coil axes are parallel to the rails.

* * * * *